United States Patent [19]

Brown et al.

[11] Patent Number: 6,036,929
[45] Date of Patent: Mar. 14, 2000

[54] PROCESS FOR THE RECOVERY OF ZINC FROM AQUEOUS PROCESS STREAMS

[75] Inventors: William T. Brown, Jonesborough; Harold E. Carman; Ralph D. Goins, both of Kingsport, all of Tenn.

[73] Assignee: Eastman Chemical Company, Kingsport, Tenn.

[21] Appl. No.: 08/969,544

[22] Filed: Nov. 13, 1997

Related U.S. Application Data

[60] Provisional application No. 60/030,682, Nov. 13, 1996.

[51] Int. Cl.7 ........................................ C01G 9/00
[52] U.S. Cl. .......................... 423/104; 423/491; 423/622; 423/103
[58] Field of Search ................... 423/622, 106, 423/104; 562/400, 607

[56] References Cited

U.S. PATENT DOCUMENTS

| | | |
|---|---|---|
| 1,192,061 | 7/1916 | Hickman .................................. 427/491 |
| 3,985,858 | 10/1976 | Cosgrove . |
| 4,680,126 | 7/1987 | Frankard et al. . |
| 4,736,063 | 4/1988 | Coleman et al. . |
| 5,232,490 | 8/1993 | Bender et al. . |
| 5,246,684 | 9/1993 | Brown et al. ........................... 423/101 |

FOREIGN PATENT DOCUMENTS 288816  10/1983  Germany .

*Primary Examiner*—Peter F. Kulkosky
*Attorney, Agent, or Firm*—Jon D. Wood; Harry J. Gwinnell

[57] ABSTRACT

The invention provides a process for the removal and recovery of zinc from an aqueous process stream. In particular, the process of the invention is useful in the removal and recovery of zinc compounds such as zinc chloride from an aqueous effluent stream produced in various manufacturing processes such as the manufacture of sorbic acid.

6 Claims, No Drawings

6,036,929

PROCESS FOR THE RECOVERY OF ZINC FROM AQUEOUS PROCESS STREAMS

This application claims benefit of Provisional Appln No. 60/030,682 filed Nov. 13, 1996.

BACKGROUND INFORMATION

1. Field of the Invention

The invention relates a process for the removal and recovery of zinc from aqueous process streams. In particular, a process of the invention is useful in the removal and recovery of zinc chloride from an aqueous process stream such as an aqueous effluent stream resulting from the manufacture of sorbic acid.

2. Description of the Related Art

Certain chemical manufacturing processes such as the process used to manufacture sorbic acid result in an aqueous effluent stream which contains one or more dissolved zinc compounds such as zinc chloride. One method of manufacturing sorbic acid is described in U.S. Pat. No. 4,736,063. Environmental constraints require substantial reduction in the concentration of zinc in such effluent streams prior to the release of the stream to the environment. Zinc compounds such as zinc chloride are extremely toxic to aquatic life and cannot be treated in conventional waste water treatment facilities.

SUMMARY OF THE INVENTION

The invention provides a process for the removal and recovery of zinc from aqueous process streams such as an aqueous effluent stream produced in the manufacture of sorbic acid. Sorbic acid and potassium sorbate are useful as anti-microbial shelf-life extenders in foods.

DETAILED DESCRIPTION OF THE INVENTION

One embodiment of the invention is a process which removes substantially all of the zinc from an aqueous, zinc chloride solution and, advantageously, permits the recovery of a relatively concentrated aqueous solution of zinc chloride.

According to the invention, a process is provided for the removal and recovery of zinc from an aqueous zinc chloride solution by the steps of:

(1) treating an aqueous zinc chloride solution having a zinc [Zn] concentration of about 10 to 10,000 parts per million (ppm) zinc with sufficient aqueous sodium hydroxide solution to produce an aqueous suspension of zinc hydroxide having a pH of about 9.5 to 11;
(2) subjecting the suspension of step (1) to filtration using a filter which is capable of filtering particles having a particle size of 0.5 micron to obtain a solid comprising zinc hydroxide and a filtrate which contains not more than 2 ppm zinc; and
(3) contacting the zinc hydroxide collected on the filter in step (2) with hydrochloric acid or aqueous acetic acid to obtain an aqueous solution of zinc chloride or acetate containing at least 10 weight percent zinc.

The process enables the zinc content of zinc chloride-containing effluent streams to be reduced sufficiently to permit the disposal of the effluent according to conventional disposal procedures. The process also permits the regeneration/recovery of zinc chloride in the form of a concentrated aqueous solution which may be reused in the same or other chemical processes. In another aspect of the present invention, the concentration of zinc in the effluent stream is reduced by about 15 fold, more preferably about 30 fold, even more preferably about 50 fold, and optimally about 100 fold.

Zinc is precipitated from the aqueous effluent stream by contacting with aqueous sodium hydroxide to precipitate the zinc as zinc hydroxide. The zinc hydroxide is filtered on a filter capable of filtering particles with a fine particle size of, for example, about 1.0 micron. Preferably, the zinc hydroxide is filtered on a filter capable of filtering particles with a particle size of about 0.5 micron. The zinc hydroxide is contacted with aqueous hydrochloric acid or aqueous acetic acid to give a concentrated solution of zinc chloride or zinc acetate which can disposed of by the normal means.

The first step may be carried out at a temperature of about 20 to 80° C., preferably about 30 to 40° C., using an aqueous sodium hydroxide solution containing from about 5 to 50 weight percent sodium hydroxide. It is preferred that the mixture obtained in step (1) has a pH of about 9.5. The zinc [Zn] concentration of the aqueous zinc chloride solution used in step (1) more typically is in the range of about 50 to 200 ppm. This aqueous zinc chloride solution also may contain other materials or compounds, e.g., dissolved or partially dissolved sorbic acid.

The filter means utilized in step (2) must be capable of removing particles having a size of 0.5 microns. Multiple pleated, polypropylene fiber filter cartridges are one type of a suitable filter means. The number of filter elements used is a function of flow rate. The temperature at which the second step may be carried out is in the range of about 20 to 80° C., preferably about 30 to 40° C.

The third step may be carried out at a temperature of about 20 to 50° C., preferably about 30 to 40° C., using either an aqueous hydrochloric acid or aqueous acetic acid solution. The hydrochloric acid solution may have a hydrogen chloride concentration of about 5 to 37 weight percent. The aqueous acetic acid solution may have an acetic acid concentration of about 10 to 25 weight percent. The concentration of the regenerated/recovered zinc chloride solution produce by step (3) corresponds to a zinc [Zn] concentration of at least 15 weight percent, preferably a zinc concentration of about 15 to 18 weight percent.

A further understanding can be obtained by reference to certain specific examples which are provided herein for purpose of illustration only and are not intended to be limiting unless otherwise specified.

EXAMPLES

Example 1

An aqueous sorbic acid process stream (1000 mL) containing 103 ppm zinc and having a pH of 2.3 was charged to a 2000 mL beaker. After adding 0.5 grams of Dicalite filter aid the pH of the stream was adjusted to 9.0 with aqueous sodium hydroxide with stirring at room temperature. After stirring for 15 minutes after the pH adjustment the suspension was vacuum filtered on a Buchner funnel. The concentration of zinc in the filtrate was 2.6 ppm as zinc.

Example 2

A procedure as in example 1 was followed except that the pH was adjusted to 10.0. The concentration of zinc in the filtrate was less than 1 ppm.

Example 3

A procedure as in example 1 was followed except that the pH was adjusted to 10.5. The concentration of zinc in the filtrate was less than 1 ppm.

Example 4

A procedure as in example 1 was followed except that the pH was adjusted to 11.0. The concentration of zinc in the filtrate was 3.4.

Example 5

An aqueous sorbic acid process stream (4998 g) containing 130 ppm zinc was charged to a 5000 mL beaker. The pH of the stream was adjusted to 9.75 with aqueous sodium hydroxide with stirring at room temperature. After stirring for 15 minutes after the pH adjustment the suspension was vacuum filtered on a Buchner funnel through Dicalite filter aid. The solids on the filter were stirred with 10 g acetic acid and 80 g water at room temperature for one hour. The mixture was vacuum filtered on a Buchner funnel. This gave 74.4 g of solution with a zinc concentration of 7109 ppm zinc.

The claimed invention is:

1. A process for the removal of zinc from a zinc containing aqueous system comprising the steps of:

contacting a first zinc containing aqueous system having a zinc concentration of between 10 and 10,000 parts per million (ppm) with an aqueous solution of sodium hydroxide to form an aqueous suspension of solid zinc hydroxide having a pH of about 9.5–11;

collecting said solid zinc hydroxide from said aqueous suspension; and treating the collected solid zinc hydroxide with an aqueous acetic acid or hydrochloric acid solution to produce a second aqueous solution containing at least 10 weight percent zinc.

2. A process of claim 1, wherein said zinc containing aqueous system is an aqueous effluent stream resulting from the manufacture of sorbic acid.

3. A process of claim 1, wherein said collecting step comprises filtering said zinc hydroxide precipitate through a filter system capable of removing particles having a particle size of 0.5 micron.

4. A process of claim 3, wherein said filtering is carried out between 20 and 80° C.

5. A process of claim 1, wherein said treating step is carried out between 20 and 50° C.

6. A process of claim 1, wherein said contacting step is carried out between 20 and 80° C.

* * * * *